United States Patent [19]
Vakavtchiev

[11] Patent Number: 5,638,144
[45] Date of Patent: Jun. 10, 1997

[54] BACK VISION EYEGLASSES

[76] Inventor: Violin S. Vakavtchiev, 765 Mountain Ave., Springfield, N.J. 07081

[21] Appl. No.: 556,168

[22] Filed: Nov. 9, 1995

[51] Int. Cl.$^6$ ........................................ G02C 7/14
[52] U.S. Cl. ............................................ 351/50
[58] Field of Search .................... 351/41, 50, 59, 351/60, 65, 68, 72; 2/DIG. 8

[56] References Cited

U.S. PATENT DOCUMENTS

| | | | |
|---|---|---|---|
| 1,272,833 | 7/1918 | Metcalf | 351/50 |
| 1,359,576 | 11/1920 | Colman | 351/50 |
| 3,617,115 | 11/1971 | Pratt | 351/50 |
| 3,998,058 | 12/1976 | Chaney et al. | 2/DIG. 8 X |
| 4,349,246 | 9/1982 | Binner | 351/50 X |
| 5,005,964 | 4/1991 | Berke et al. | 351/50 |
| 5,044,741 | 9/1991 | De Giacomi | 351/50 |

FOREIGN PATENT DOCUMENTS

| | | | |
|---|---|---|---|
| 493084 | 5/1953 | Canada | 351/41 |
| 40210 | 3/1907 | Switzerland | 351/50 |
| 5359 | of 1857 | United Kingdom | 351/50 |

*Primary Examiner*—Huy Mai
*Attorney, Agent, or Firm*—Michael I. Kroll

[57] ABSTRACT

Back vision eyeglasses comprising a frame worn on a face in front of eyes of a person. A pair of regular lenses are held stationary in the frame. A pair of rearwardly facing adjustable mirror lenses are mounted on one side of the frame. Most of an ordinary field of vision seen through the regular lenses is not obstructed and interfered with by the adjustable mirror lenses. The adjustable mirror lenses are instantly available for use by the person directing a line of vision from the eyes slightly to either side to see reflected images coming from behind.

16 Claims, 6 Drawing Sheets

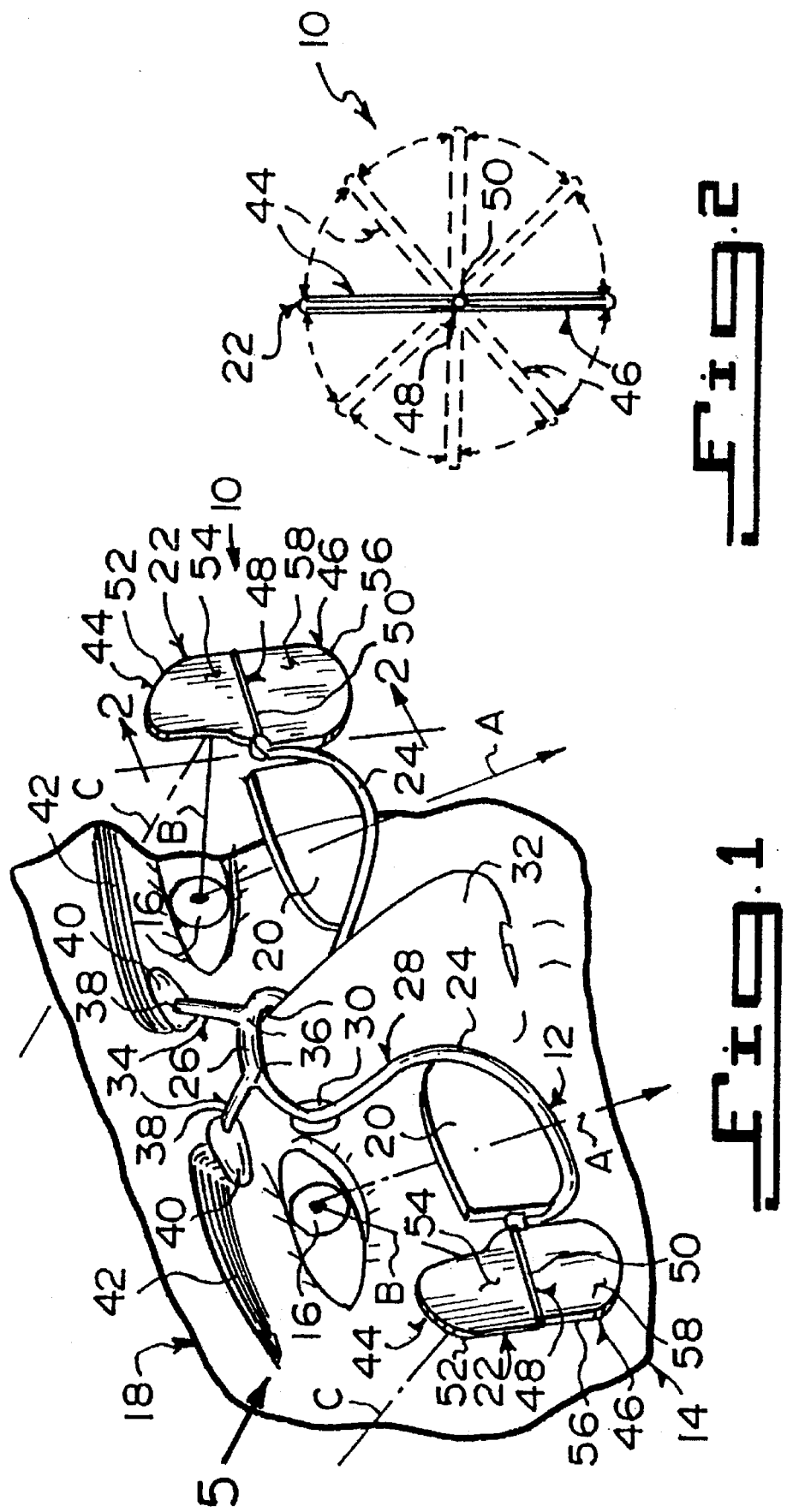

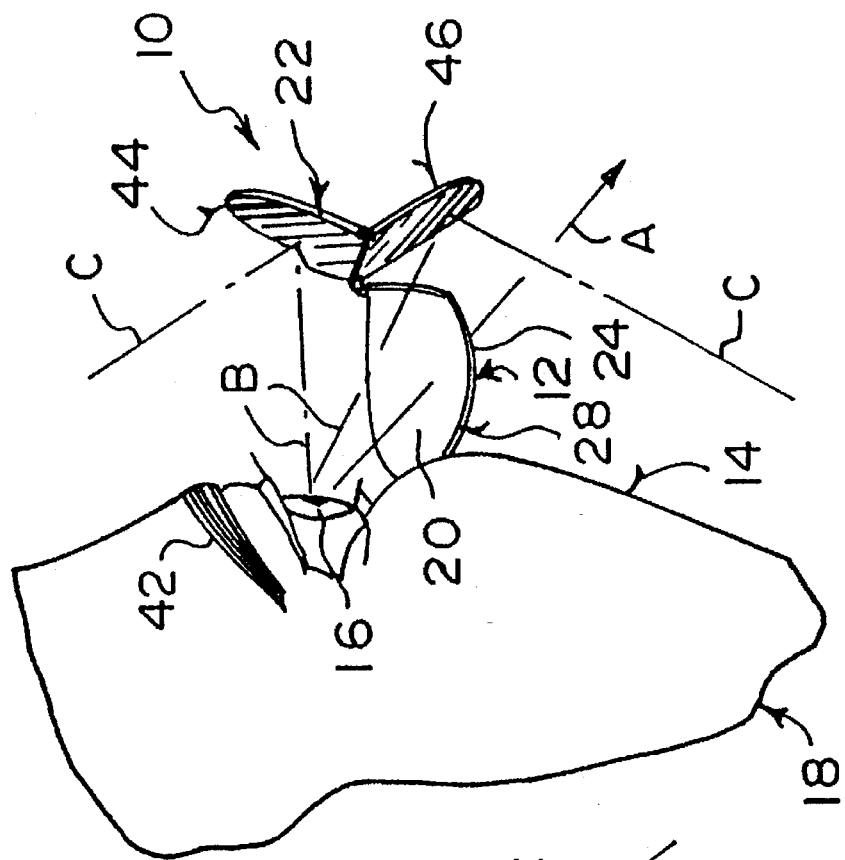
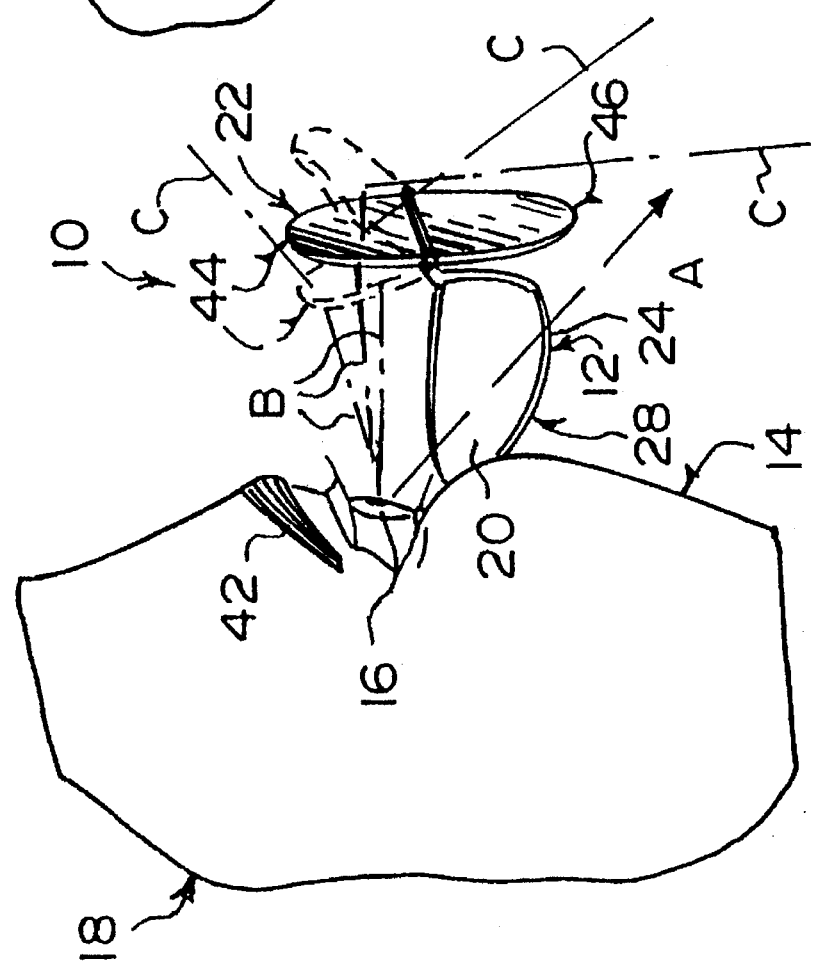

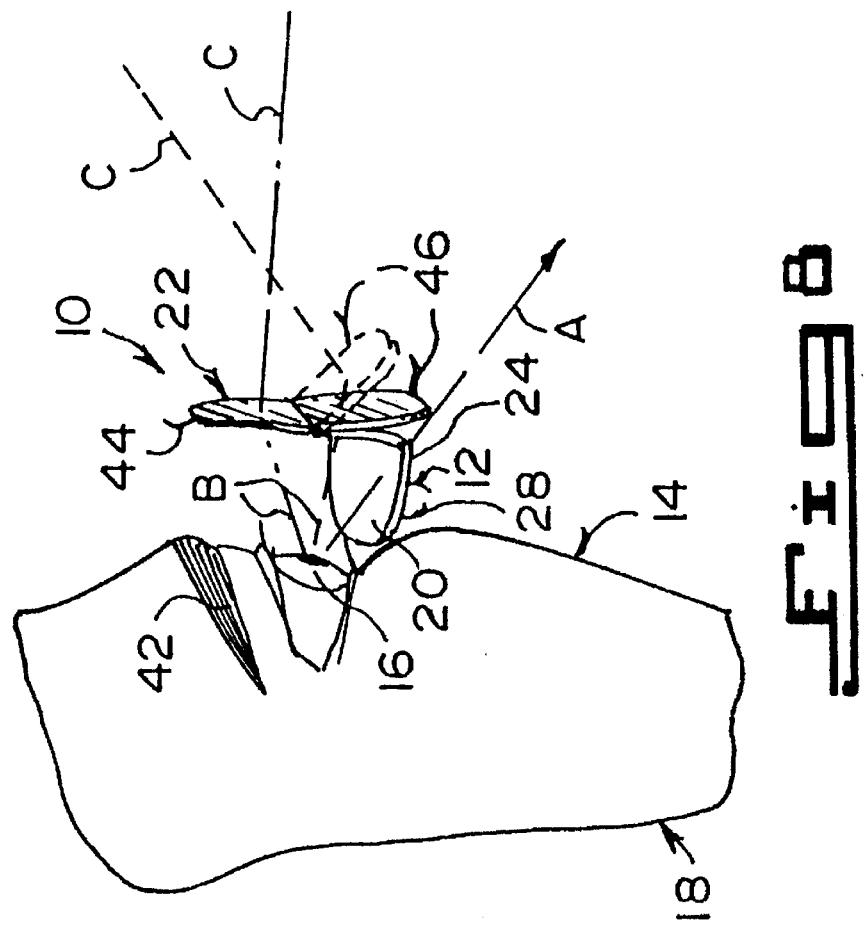
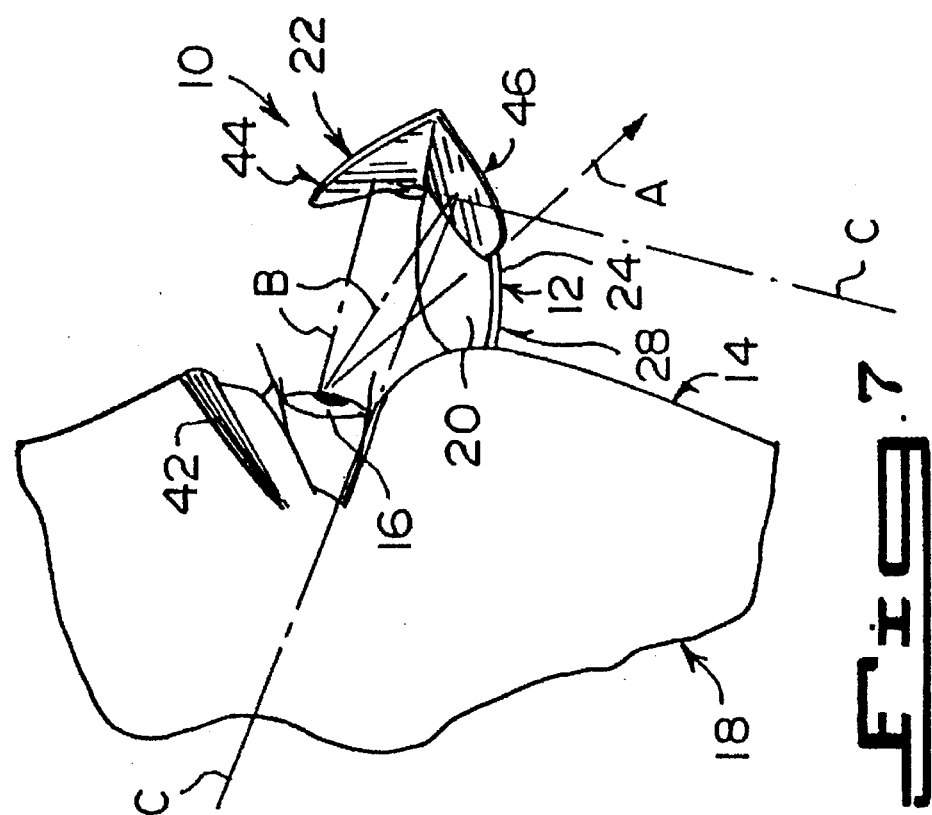

BACK VISION EYEGLASSES

BACKGROUND OF THE INVENTION

1. Field of the Invention

The instant invention relates generally to eyeglasses and more specifically it relates to back vision eyeglasses.

2. Description of the Prior Art

Numerous eyeglasses have been provided in prior art. For example, U.S. Pat. Nos. 1,272,833 to Metcalf; 1,359,576 to Colman; 3,617,115 to Pratt; 3,988,058 to Chaney et al.; 4,349,246 to Binner and 5,044,741 to DeGiacomi all are illustrative of such prior art. While these units may be suitable for the particular purpose to which they address, they would not be as suitable for the purposes of the present invention as heretofore described.

Metcalf, Jefferson D.

EYEGLASSES

U.S. Pat. No. 1,272,833

A pair of eyeglasses comprising rim portions left open at their outer sides and provided with outstanding ends which are screw threaded exteriorly with a thread common to both. Each of the projecting ends being provided with a transverse notch on the inner side. Bow mounting members are provided with stem and head portions shaped to be fitted between the ends of the rim portions in such relation that the head portions are received in the notches thereof. Bows are carried by the bow mounting members. Internally screw threaded sleeves are arranged to be received over the screw threaded ends of the rim portion to hold the same tightened against the leases and to secure the bow mounting members in place.

Colman, Lulu M.

EYEGLASSES

U.S. Pat. No. 1,359,576

Eye glasses having mirrors inserted in the lenses within the circuit of the edge thereof. A frame has portions overlying the backs of the mirrors and consequently lying within the general shape of the lens.

Pratt, Lawrence S.

EYEGLASSES HAVING A CORRECTED RETROVISION CAPABILITY

U.S. Pat. No. 3,617,115

A new form of eyeglass construction having a retrovision capability including a corrective effect. One of the eyeglass lenses is mirrored on at least part of its substantially flat forward surface, so that light rays emanating from behind the wearer's head pass through the lens twice before reaching his eye. The lens may be designed to correct any defect in the vision of that eye to the greatest extent possible. Opaque material can be applied to portions of the lens to screen out extraneous images.

Chaney, David R.

Wendel, David G.

REAR-VIEW MIRROR DEVICE FOR ATTACHMENT TO THE ACCESSORIES OF THE USER

U.S. Pat. No. 3,988,058

A rear-view mirror assembly for mounting on various types of apparel such as the frame of eyeglasses, the peak of a cap, a helmet, etc. The device includes a body which has an attachment member at one end thereof. A U-shaped mirror supporting arm has a ball and socket connection at the end of one arm of the U-shaped arm swivelly connected to the end of the body member. The other arm has a ball and socket connection with a mirror mounting device in which is mounted a mirror.

Binner, Tihamer S.

REAR VIEW MIRROR WITH SLIT CLIP ATTACHMENT

U.S. Pat. No. 4,349,246

A rear view mirror for being personally worn by a user. The mirror includes a clip for attachment either to the person's eyeglasses, hat, helmet, shoulder or the like. A universal joint between the mirror and clip is for directionally aligning the mirror.

DeGiacomi, Giancarlo

EYEGLASSES WITH INTEGRAL REAR VIEW MIRROR

U.S. Pat. No. 5,044,741

Eyeglasses with rear view capability wherein the external portion of at least one lens and/or of the rim is replaced by a rear view mirror part which is pivotally coupled to the lens and/or the rim and has the same shape and dimension of the replaced portion of the lens and/or the rim. Preferably the rear view mirror parts are placed above the horizon line of the view of the user who can adjust the position of the rear view mirror parts by hand according to any desired inclination.

SUMMARY OF THE INVENTION

A primary object of the present invention is to provide back vision eyeglasses that will overcome the shortcomings of the prior art devices.

Another object is to provide back vision eyeglasses in which most of the ordinary field of vision is not obstructed or interfered with, when a person is wearing the eyeglasses, while a pair of adjustable mirror lenses are instantly available for use by the person directing a line of vision slightly to either side to see images coming from behind.

An additional object is to provide back vision eyeglasses, in which the pair of adjustable mirror lenses are each mounted on a frame adjacent a regular lens, so that the angle of each adjustable mirror lens can be changed to direct reflected images coming from behind and above directly into the eyes of the person wearing the eyeglasses.

A further object is to provide back vision eyeglasses that is simple and easy to use.

A still further object is to provide back vision eyeglasses that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a front perspective view of a face of a person with parts broken away, showing the instant invention worn thereon.

3

FIG. 2 is a cross sectional view taken along line 2—2 in FIG. 1.

FIGS. 5 through 9 are perspective side views taken in the direction of arrow 5 in FIG. 1, showing the angular adjustment of one of the adjustable mirror lens with respect to an eye of the person.

Similar reference characters denote corresponding features consistently throughout the attached drawings.

DETAILED DESCRIPTION OF THE PREFERRED EMBODIMENTS

Figure 3:
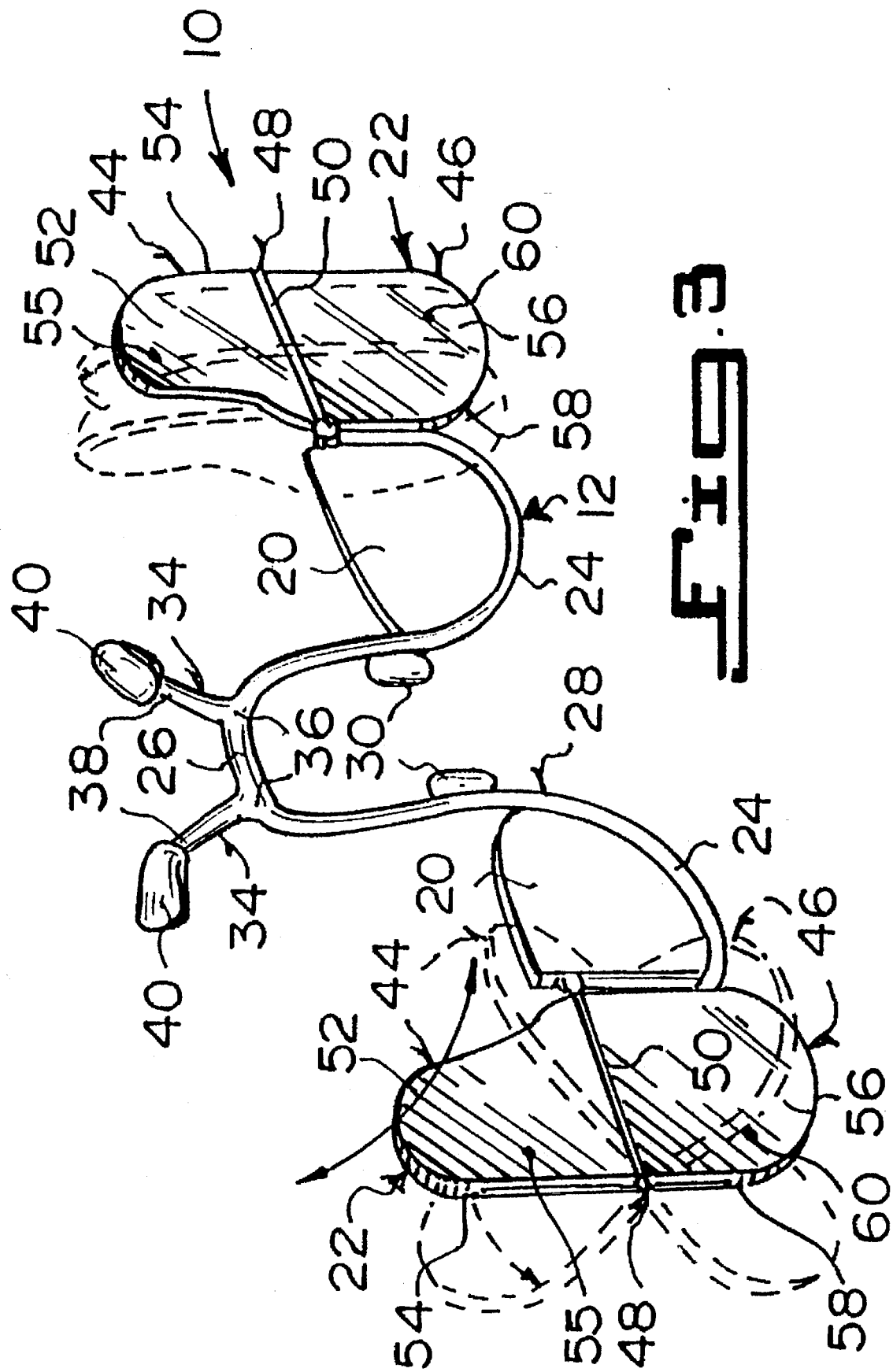
FIG. 3 is a rear perspective view of the instant invention per se.
Figure 4:
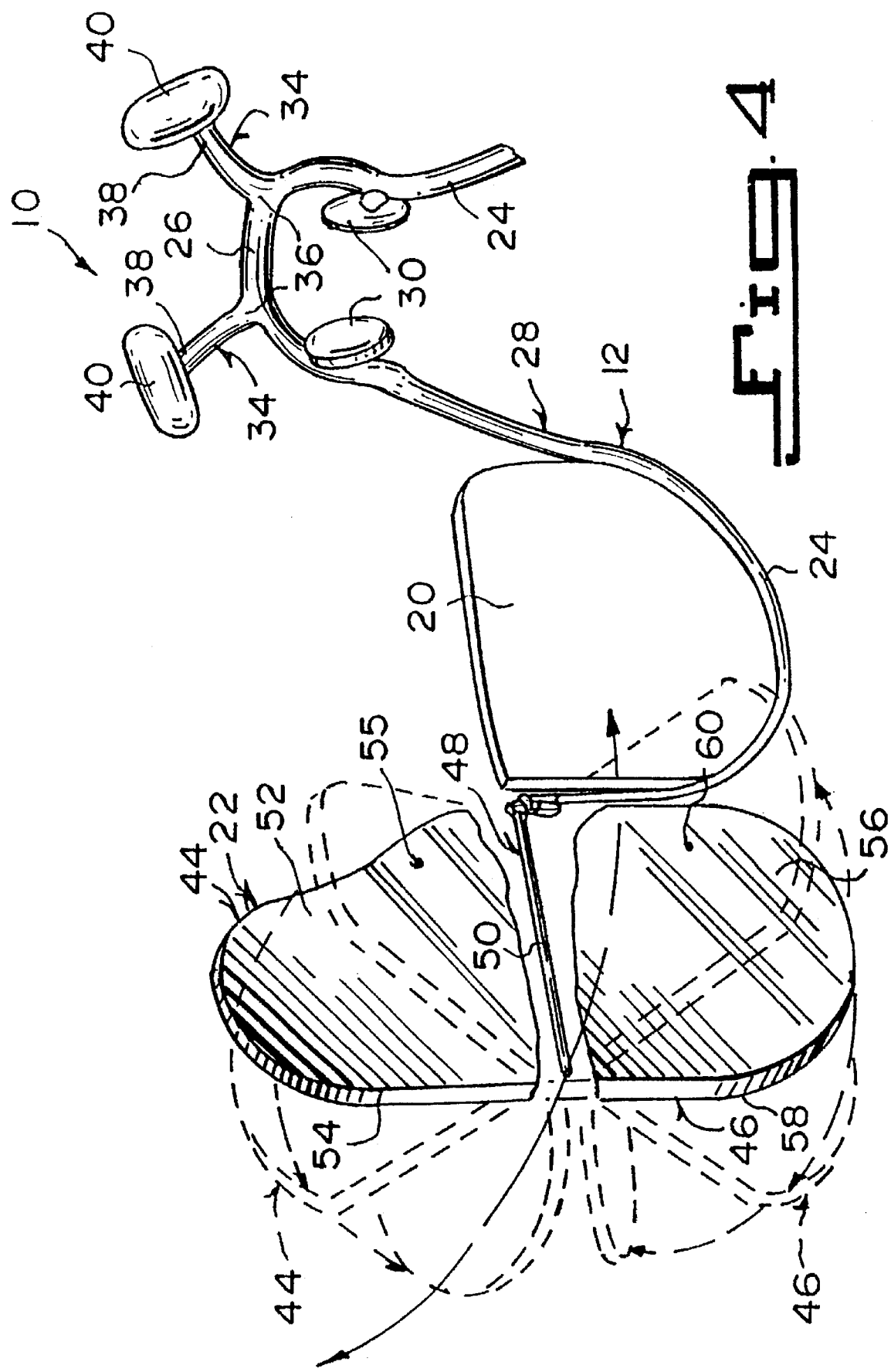
FIG. 4 is an enlarged rear perspective view of a portion thereof, with parts broken away.
Figure 9:
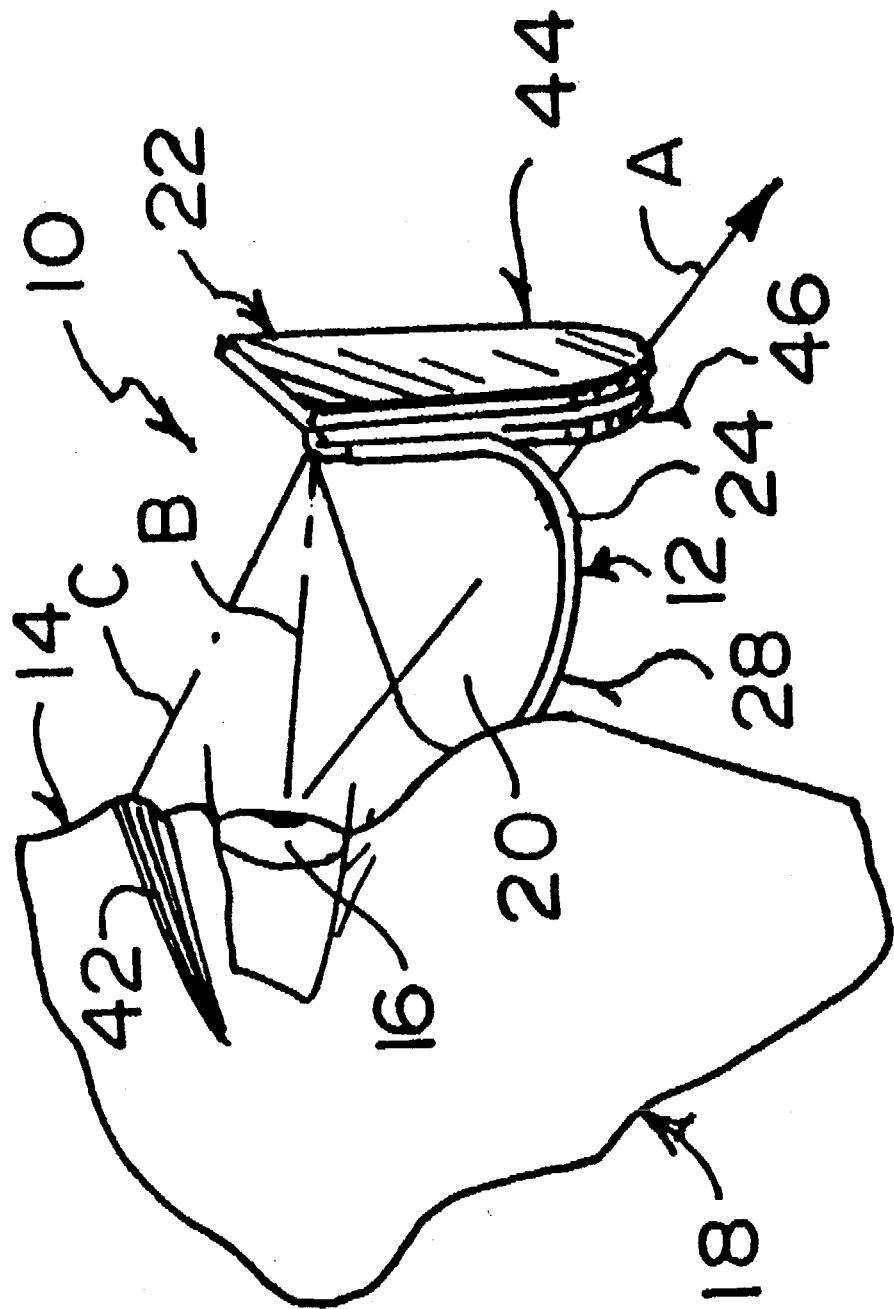

Turning now descriptively to the drawings, in which similar reference characters denote similar elements throughout the several views, FIGS. 1 through 9 illustrate back vision eyeglasses 10, comprising a frame 12 worn on a face 14 in front of eyes 16 of a person 18. A pair of regular lenses 20 are held stationary in the frame 12. A pair of rearwardly facing adjustable mirror lenses 22 are mounted on one side of the frame 12. Most of an ordinary field of vision "A", seen through the regular lenses 20, is not obstructed and interfered with by the adjustable mirror lenses 22. The adjustable mirror lenses 22 are instantly available for use by the person 18 directing a line of vision "B" from the eyes 16, slightly to either side to see reflected images "C" coming from behind.

The frame 12 contains a pair of J-shaped eye wires 24 for holding the regular lenses 20. A bridge piece 26 connects the eye wires 24 together to form a front rim assembly 28. The frame 12 further contains a pair of nose pads 30. Each nose pad 30 is affixed to one eye wire 24 adjacent the bridge piece 26, to be cushioned on a nose 32 of the person 18.

The frame 12 still further contains a pair of arms 34. Each arm 34 is attached at a first end 36 to the junction of one eye wire 24 with the bridge piece 26. The arms 34 extend upwardly at a slight angle, with second ends 38 of the arms 45 spaced away from each other. A pair of eyebrow tabs 40 are provided. Each eyebrow tab 40 is secured to the second end 38 of one arm 34, to bear against an eyebrow 42 of the person 18, so as to stabilize the frame 12 on the face 14 of the person 18.

Each adjustable mirror lens 22 includes an upper lens portion 44 and a lower lens portion 46. A structure 48 is for pivoting the upper lens portion 44 and the lower lens portion 46 from the side of the frame 12. An angle of the upper lens portion 44 and the lower lens portion 46 can be changed to direct reflected images "C" coming from behind and above directly into the line of vision "B" from the eyes 16 of the person 18.

The pivoting structure 48 is a horizontal hinge rod 50 located between a bottom edge of the upper lens portion 44 a top edge of the lower lens portion 46. The upper lens portion 44 and the lower lens portion 46 can be angularly adjusted about the hinge rod 50.

Each upper lens portion 44 includes a flat piece of transparent material 52. A thin layer of reflective material 54 is coated on a surface of the flat piece of transparent material 52 to face rearwardly. The flat piece of transparent material 52 is clear plastic 55.

Each lower lens portion 46 includes a flat piece of transparent material 56. A thin layer of reflective material 58 is coated on a surface of the flat piece of transparent material

4

56 to face rearwardly. The flat piece of transparent material 56 is clear plastic 60.

OPERATION OF THE INVENTION

To use the back vision eyeglasses 10, the following steps should be taken:

1. Place the nose pads 30 on the nose 32 of the person 18.
2. Press the eyebrow tabs 40 on the second ends 38 of the arms 34 against the eyebrows 42 of the person 18.
2. Position the upper lens portion 44 and the lower lens portion 46 of each adjustable mirror lens 22 at a proper angle to a respective eye 16 of the person 18, by swinging up and down on the hinge rod 50.
4. Look along a line of vision "B" into the upper lens portion 44 or the lower lens portion 46 of either adjustable mirror lens 22, so as to see the reflected images "C" from behind.
5. Look along lines of vision "A" through the regular lenses 20, so as to see most of the ordinary field of vision.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Back vision eyeglasses comprising:
   a) a frame worn on a face in front of eyes of a person;
   b) a pair of regular lenses held stationary in said frame;
   c) a pair of rearwardly facing adjustable mirror lenses, each including an upper lens portion and a lower lens portion, and each mounted on one side of said frame, so that most of an ordinary field of vision seen through said regular lenses is not obstructed and interfered with by said adjustable mirror lenses, while said adjustable mirror lenses are within a direct line of sight of the person and are instantly available for use by the person directing a line of vision from the eyes slightly to either side to see reflected images coming from behind; and
   d) means for horizontally pivoting said upper lens portion and said lower lens portion from the side of said frame, so that an angle of said upper lens portion can be changed to direct reflected images coming from behind directly into the line of vision from the eyes of the person.

2. Back vision eyeglasses as recited in claim 1, wherein said frame includes:
   a) a pair of J-shaped eye wires for holding said regular lenses; and
   b) a bridge piece connecting said eye wires together to form a front rim assembly.

3. Back vision eyeglasses as recited in claim 2, wherein said frame further includes a pair of nose pads, whereby each said nose pad is affixed to one said eye wire adjacent said bridge piece to be cushioned on a nose of the person.

4. Back vision eyeglasses as recited in claim 3, wherein said frame further includes:
   a) a pair of arms, each said arm attached at a first end to the junction of one said eye wire with said bridge piece, so that said arms will extend upwardly at a slight angle, with second ends of said arms spaced away from each other; and
   b) a pair of eyebrow tabs, each said eyebrow tab secured to said second end of one said arm to bear against an eyebrow of the person, so as to stabilize said frame on the face of the person.

5. Back vision eyeglasses as recited in claim 4, wherein in said adjustable mirror lens includes:
   a) an upper lens portion;
   b) a lower lens portion; and
   c) means for horizontally pivoting said upper lens portion and said lower lens portion from the side of said frame, so that an angle of said upper lens portion can be changed to direct reflected images coming from behind and above directly into the line of vision from the eyes of the person.

6. Back vision eyeglasses as recited in claim 5, wherein said pivoting means is a hinge rod located between a bottom edge of said upper lens portion and a top edge of said lower lens portion, so that said upper lens portion and said lower lens portion can be angularly adjusted about said hinge rod.

7. Back vision eyeglasses as recited in claim 6, wherein each said upper lens portion includes:
   a) a flat piece of transparent material; and
   b) a thin layer of reflective material coated on a surface of said flat piece of transparent material to face rearwardly.

8. Back vision eyeglasses as recited in claim 7, wherein said flat piece of transparent material is clear plastic.

9. Back vision eyeglasses as recited in claim 8, wherein each said lower lens portion includes:
   a) a flat piece of transparent material; and
   b) a thin layer of reflective material coated on a surface of said flat piece of transparent material to face rearwardly.

10. Back vision eyeglasses as recited in claim 9, wherein said flat piece of transparent material is clear plastic.

11. Back vision eyeglasses as recited in claim 2, wherein said frame further includes:
   a) a pair of arms, each said arm attached at a first end to the junction of one said eye wire with said bridge piece, so that said arms will extend upwardly at a slight angle, with second ends of said arms spaced away from each other; and
   b) a pair of eyebrow tabs, each said eyebrow tab secured to said second end of one said arm to bear against an eyebrow of the person, so as to stabilize said frame on the face of the person.

12. Back vision eyeglasses as recited in claim 1, wherein said pivoting means is a hinge rod located between a bottom edge of said upper lens portion and a top edge of said lower lens portion, so that said upper lens portion and said lower lens portion can be angularly adjusted about said hinge rod.

13. Back vision eyeglasses as recited in claim 1, wherein each said upper lens portion includes:
   a) a flat piece of transparent material; and
   b) a thin layer of reflective material coated on a surface of said flat piece of transparent material to face rearwardly.

14. Back vision eyeglasses as recited in claim 13, wherein said flat piece of transparent material is clear plastic.

15. Back vision eyeglasses as recited in claim 13, wherein each said lower lens portion includes:
   a) a flat piece of transparent material; and
   b) a thin layer of reflective material coated on a surface of said flat piece of transparent material to face rearwardly.

16. Back vision eyeglasses as recited in claim 15, wherein said flat piece of transparent material is clear plastic.

* * * * *